United States Patent
Erkkila et al.

(10) Patent No.: US 9,772,190 B2
(45) Date of Patent: Sep. 26, 2017

(54) ORIENTATION DURING SWIMMING (71) Applicant: Polar Electro Oy, Kempele (FI)

(72) Inventors: Mika Erkkila, Oulu (FI); Harri Maatta, Kempele (FI); Jonna Puurunen, Oulu (FI)

(73) Assignee: Polar Electro Oy, Kempele (FI)

( * ) Notice: Subject to any disclaimer, the term of this patent is extended or adjusted under 35 U.S.C. 154(b) by 19 days.

(21) Appl. No.: 14/513,902

(22) Filed: Oct. 14, 2014

(65) Prior Publication Data
US 2016/0101323 A1    Apr. 14, 2016

(51) Int. Cl.
| | |
|---|---|
| G01C 21/00 | (2006.01) |
| A63B 24/00 | (2006.01) |
| G01C 21/20 | (2006.01) |
| G01S 19/19 | (2010.01) |
| G01C 21/08 | (2006.01) |
| A63B 71/06 | (2006.01) |

(52) U.S. Cl.
CPC ........ G01C 21/005 (2013.01); A63B 24/0021 (2013.01); A63B 24/0062 (2013.01); G01C 21/08 (2013.01); G01C 21/20 (2013.01); G01S 19/19 (2013.01); *A63B 2071/0655* (2013.01); *A63B 2220/836* (2013.01); *A63B 2225/60* (2013.01); *A63B 2244/20* (2013.01)

(58) Field of Classification Search
CPC ...... G01C 21/20; G01C 22/00; G01C 21/005; G01C 21/08; A63B 2220/836; A63B 2071/0666; A63B 2024/0071; A63B 2225/60; A63B 2244/20; A63B 24/0021; A63B 2208/03; A63B 2220/20; A63B 24/0062; A63B 2071/065; A63B 24/0003; A63B 2071/0655; G01S 19/19; B63C 2011/021; B63C 11/00; B63C 11/02; B63C 2213/00; G08B 21/088
See application file for complete search history.

(56) References Cited

U.S. PATENT DOCUMENTS

| | | | | |
|---|---|---|---|---|
| 6,029,515 | A | * | 2/2000 | Lahteenmaki .......... B63C 11/02 73/178 R |
| 6,510,379 | B1 | * | 1/2003 | Hasegawa .............. G01C 21/20 340/988 |
| 7,310,063 | B1 | * | 12/2007 | Brown .................. B63C 11/205 128/201.11 |

(Continued)

FOREIGN PATENT DOCUMENTS

| | | |
|---|---|---|
| DE | 10 2012 009 778 A1 | 11/2013 |
| WO | 2012/046156 A1 | 4/2012 |

OTHER PUBLICATIONS

Dcrainmaker "Hands on with the IOLITE GPS-Enabled Swim Goggles: DC Rainmaker," 13 pages (May 21, 2014).

(Continued)

*Primary Examiner* — Jason Holloway
(74) *Attorney, Agent, or Firm* — Hoffmann & Baron, LLP (57) ABSTRACT

There is provided an apparatus, wherein the apparatus is configured to perform operations comprising: obtaining heading information indicating a target heading to a target; detecting, during swimming, that the swimmer deviates from the target heading; and informing the swimmer, via a user interface element, that the swimmer has deviated from the target heading.

14 Claims, 5 Drawing Sheets

(56) References Cited

U.S. PATENT DOCUMENTS

| | | | | |
|---|---|---|---|---|
| 8,638,229 B2* | 1/2014 | Downey | ............ | A63B 24/0021 340/539.13 |
| 8,700,323 B1* | 4/2014 | Souza | .................... | G01C 17/28 701/21 |
| 9,216,341 B2* | 12/2015 | Li | ......................... | A61B 5/1112 |
| 2003/0078706 A1* | 4/2003 | Larsen | .................. | G01C 21/00 701/21 |
| 2005/0186542 A1* | 8/2005 | Roncalez | ........... | A63B 24/0003 434/247 |
| 2006/0293806 A1* | 12/2006 | Basilico | ................. | G01C 21/00 701/21 |
| 2007/0006472 A1* | 1/2007 | Bauch | .................. | G01C 21/165 33/355 R |
| 2008/0046139 A1* | 2/2008 | Basilico | ................. | G01C 21/00 701/21 |
| 2010/0023262 A1* | 1/2010 | Haney | ...................... | B63J 99/00 701/469 |
| 2010/0030482 A1* | 2/2010 | Li | .......................... | A61B 5/1112 702/19 |
| 2011/0128824 A1* | 6/2011 | Downey | ............ | A63B 24/0021 368/14 |
| 2013/0080113 A1* | 3/2013 | Yuen | .................... | A61B 5/0002 702/160 |
| 2013/0187786 A1* | 7/2013 | Dadlani Mahtani | .... | A61F 9/029 340/691.8 |
| 2014/0223647 A1 | 8/2014 | Long et al. | | |
| 2015/0042476 A1* | 2/2015 | Holm | ................... | G08B 21/088 340/573.4 |

OTHER PUBLICATIONS

European Search Report, Application No. EP 15 18 8695, 7 pages, dated Feb. 10, 2016.

* cited by examiner

ORIENTATION DURING SWIMMING

BACKGROUND

Field

The invention relates generally to swimming. More specifically, the invention relates to orientation during swimming.

Description of the Related Art

It is difficult to keep an optimal heading during swimming. Therefore, a solution to better keep a correct heading is needed.

SUMMARY

According to an aspect of the invention, there is provided an apparatus.

According to an aspect of the invention, there is provided a method.

According to an aspect of the invention, there is provided a computer program product.

According to an aspect of the invention, there is provided an apparatus comprising means for performing any of the embodiments as described in the appended claims.

According to an aspect of the invention, there is provided an apparatus comprising processing means configured to cause the apparatus to perform any of the embodiments as described in the appended claims.

Some embodiments of the invention are defined in the dependent claims.

BRIEF DESCRIPTION OF THE DRAWINGS

In the following, the invention will be described in greater detail with reference to the embodiments and the accompanying drawings, in which.

DETAILED DESCRIPTION

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
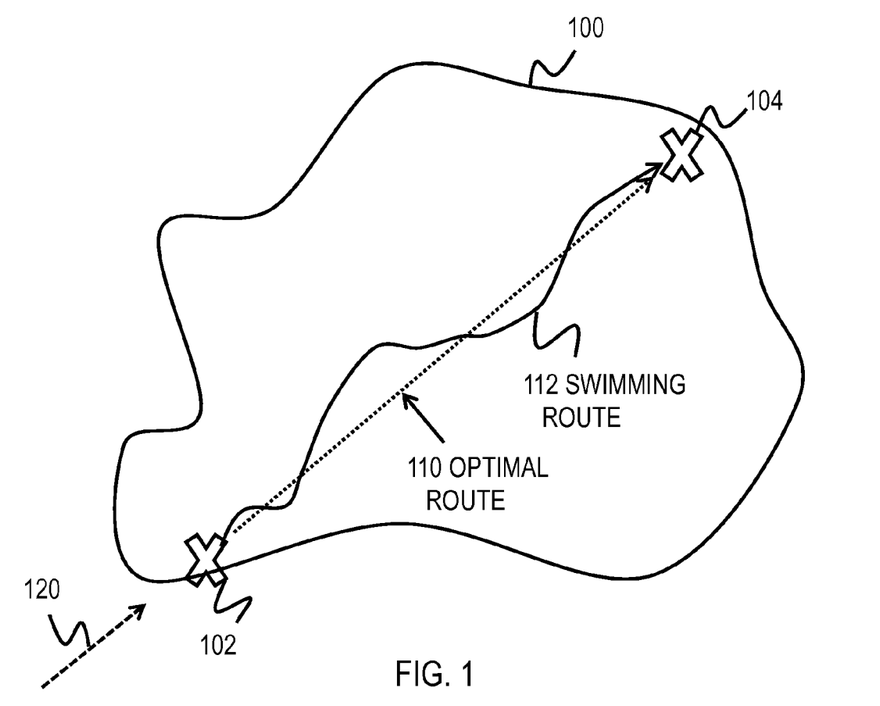
FIG. 1 presents a swimming scenario according to an embodiment.

With reference to FIG. 1, let us assume that a swimmer starts swimming outdoors across a lake 100, for example, from a start point 102 to a goal 104 (such as a finish line or a transition/turning point). Typically, the swimmer may look where the finish point (or goal) 104 is and start swimming. Especially in outdoor swimming, but also in indoor swimming, the swimmer may deviate from the optimal track/route 110, i.e. the swimmer may lose the correct heading/bearing towards the goal 104. The swimmer may then need to raise his/her head above the surface level to look again where the goal 104 is. This is cumbersome and slows down the swimming performance during which the swimmer should be able to concentrate on swimming and breathing, not in looking where the goal 104 is. It may be that, due to the unnecessary turns, a swimming route 112 swam by the swimmer may not coincide with the optimal, direct route 110 between the start 102 and the goal 104. The swimming route 112 may end up being longer than the optimal route 110. At least in competitions, this is not desired. Therefore, a solution is needed which helps the swimmer to keep the correct heading during swimming.

Figure 2:
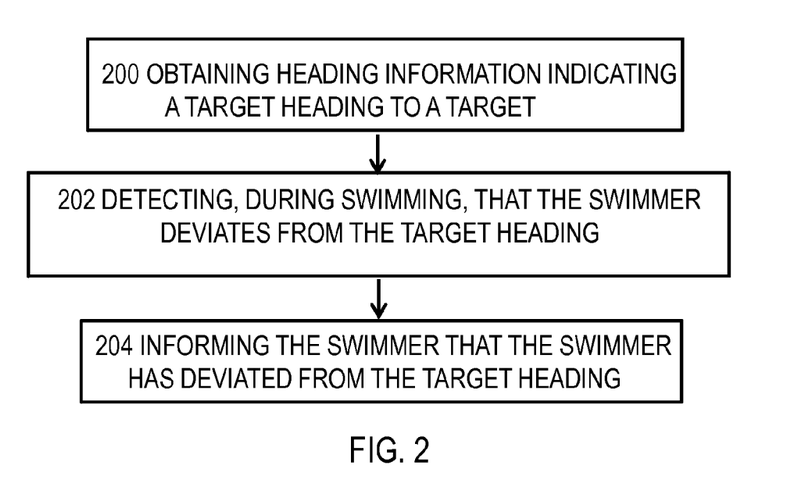
FIG. 2 shows a method according to an embodiment.

Accordingly, it is proposed, as shown in FIG. 2, that an orientation apparatus for swimming obtains, in step 200, heading information indicating a target heading to a target. The target may be, e.g., the finishing location 104, or a turning location (in case such exists during the path to be swam). The target heading is depicted in FIG. 1 as a dashed line 120. The heading 120 may define the direction for the optimal route (target swimming line) 110 between two locations comprising, such as from the start location 104 (i.e. a starting reference point) to the target 104. However, as indicated by the term "heading", the target heading 120 may not, in an embodiment, define a route to follow in the sense of map navigation, but only a heading/bearing/orientation/direction 120 from the start location 102 to the target 104.

In an embodiment, there may be more than one target, such as at least one intermediate target (a turning point) in addition to the finishing target 104. Therefore, in general, the heading may define a direct line (shortest connection) between any two of the following: the start location 102, a turning location, the finishing location 104. However, for simplicity sake, let us consider, for now, that there is only one target 104. In general, the reference "target 104" may mean the next target on the swimming route, be it the finish location or the next turning location.

The indicated target heading 110 may in an embodiment be based on a magnetic direction of the target 104. That is, when looking from the start location 102, the target 104 locates in a certain magnetic direction on the horizontal plane with respect to the Earth's magnetic north. Currently magnetometers embedded on devices, such as smart phones and wrist watches, are able to determine the magnetic heading accurately enough.

In an embodiment, which may be applied alone or in combination to the magnetic heading, the target heading 110 may be based on geographic coordinates of the target 104. That is, the target 104 is located at a certain point/location in geographical coordinates (longitude and latitude) whereas the start location 102 is located in different coordinates. By knowing the coordinates, it may be possible to define a heading between two known locations. In an embodiment, satellite positioning system, such as GPS, may be of use.

Now that the target heading 120 is obtained in step 200, the method of FIG. 2 may continue in step 202 by the orientation apparatus detecting that the swimmer deviates, during swimming, from the target heading 120, and in step 204 by informing the swimmer that the swimmer has deviated from the target heading 120. This may be advantageous as then the swimmer may, after being informed, correct a current heading of the swimmer to the target heading 120 so as to more quickly and more reliably reach the target 104 without the swimmer looking where the target 104 is.

Figure 8:
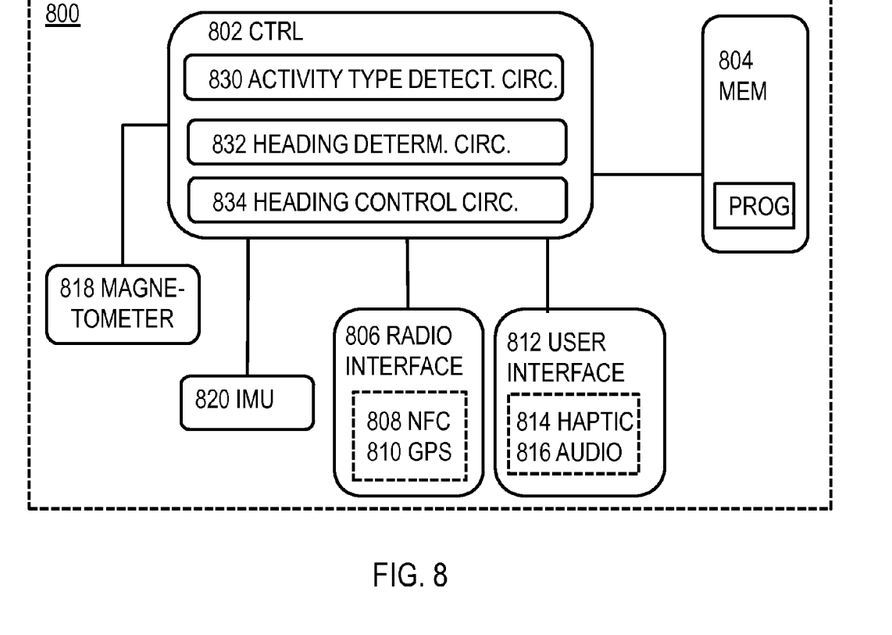
FIG. 8 shows an apparatus according to an embodiment.

FIG. 8 depicts the orientation apparatus 800 performing the method of FIG. 2. The apparatus 800 may comprise a control circuitry (CTRL) 802, such as at least one processor, and at least one memory 804 including a computer program code (PROG). The at least one memory and the computer program code (PROG), are configured, with the at least one processor, to cause the apparatus 800 to carry out the method of FIG. 2, as well as any other embodiments described. The memory 804 may be implemented using any suitable data storage technology, such as semiconductor based memory devices, flash memory, magnetic memory devices and systems, optical memory devices and systems, fixed memory and removable memory.

Figure 9A:
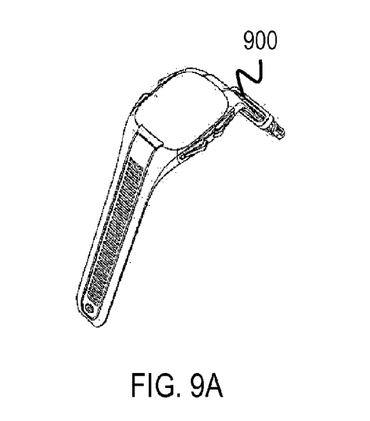
FIGS. 9A and 9B illustrate some examples on where the apparatus may locate, according to some embodiments.

The orientation apparatus 800 may be, as shown in FIG. 9A, comprised in a wrist device 900, such as in an activity tracker or a training computer. The wrist device may be worn on a wrist of the user. The wrist device 900 may be configured to detect activity of the user by measuring or receiving exercise data, such as heart activity of the swimmer. The wrist device 900 may comprise exercise sensors, such as an optical heart activity sensor, an accelerometer, a GPS receiver. In one embodiment, the wrist device 900 comprises a receiver for receiving information from external exercise sensors, such as from a heart activity sensor placed on a chest strap, or from an external GPS receiver.

Figure 9B:
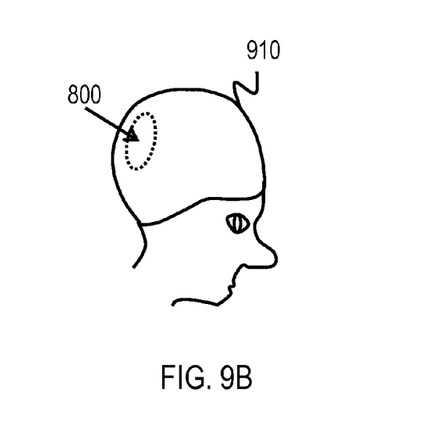

In another embodiment, the orientation apparatus 800 may be, as shown in FIG. 9B, comprised in a swimming gear, such as in a swimming cap or in a swimming costume. The apparatus 800 may be embedded in or attached to the swimming gear 910. It may be advantageous to install the orientation apparatus 800 on the location of the swimming cap which is at the highest point during swimming, such as the back of the swimming cap. In such point, the apparatus 800 is mostly above the water level which may be beneficial in case GPS is used to keep the target heading 120.

The apparatus 900 may also comprise an attachment unit for attaching the apparatus to a swimmer. This attachment unit may be the wrist straps of the wrist device 900 or the swimming gear 910, such as the swimming cap.

Figure 3:
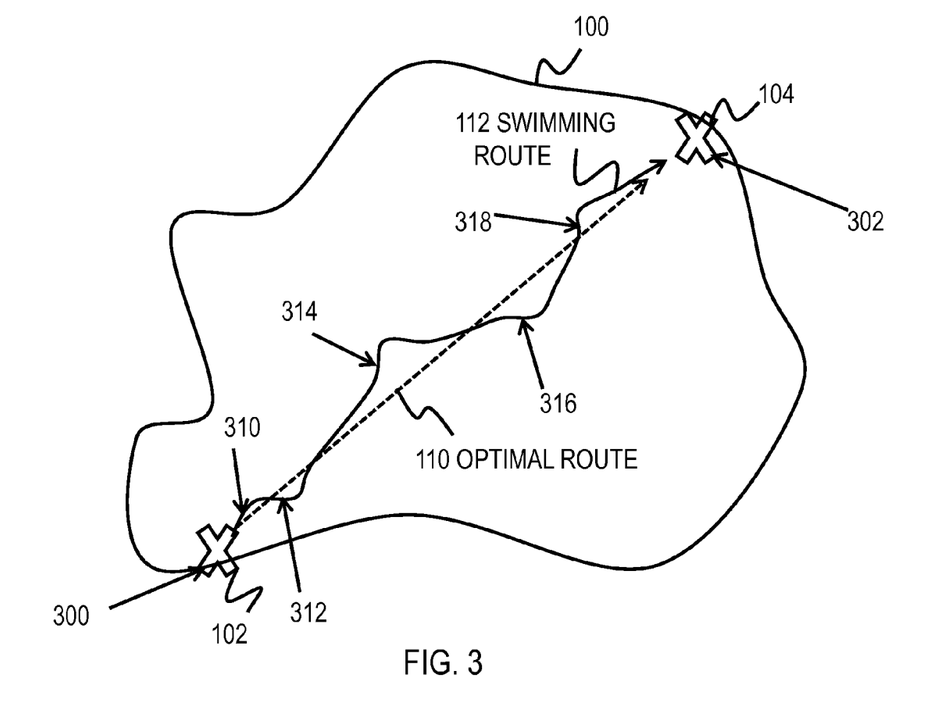
FIGS. 3 to 4 show swimming scenarios, according to some embodiments.

Let us take look at the proposed method for improving orientation during swimming with reference to FIG. 3. As the swimmer is swimming, the apparatus 800 may detect whether or not the swimmer deviates from the target heading 120. In FIG. 3, such deviations are detected at points 310-318. At these points, or substantially around these points 310-318, orientation apparatus 800 may have informed the swimmer about the deviated course. Accordingly, the swimmer may take corrective actions to restore the target heading 120, or in an embodiment, go back to the target route defined by the target heading 120. The orientation apparatus 800 may be accurate enough to detect the deviation from the target heading 120 rapidly, so that the swimmer may immediately correct his/her bearing. Thus, large deviations from the optimal route 110 may not take place.

In an embodiment, the deviation from the target heading 120 may be detected on the basis of magnetometer readings of the apparatus 800 during swimming. When the magnetometer readings indicate that the magnetic direction of the swimming changes, the swimmer may have deviated off the target heading 120. Alternatively or in addition to, the GPS readings of the apparatus 800 may indicate that the swimmer has deviated from the target heading 120 or from the optimal route 110. In one embodiment the GPS and/or magnetometer readings are recorded for a predetermined averaging period of time to yield an average heading of the swimmer, which is then compared to the target heading 120. Example averaging period may be anything between 1 and 10 seconds, to mention only a few non-limiting examples.

In an embodiment, the deviation may be with respect to a target swimming line/route 110 defined by the target heading 120. That is, in case it is detected that the swimmer's location is not on the correct swimming line 110, the swimmer may be informed. The location of the swimmer is detected from satellite positioning, for example.

In an embodiment, it may be that the deviation means that the current heading of the swimmer is different than the target heading, which may lead the swimmer to depart from the target swimming line 110, if the current heading is not corrected. The current heading may be detected from the magnetometer and/or from the GPS readings.

When the magnetometer 818 of the apparatus 800 is used to detect the current heading of the swimmer, it may be important that a 3-dimensional orientation of the apparatus 800 is taken into account. In an embodiment, the apparatus 800 may detect, with the IMU 820, the 3-dimensional orientation information of the apparatus 800 and take that into account when determining the current heading of the swimmer. The target heading 120 may be determined in a reference 3-dimensional orientation of the apparatus 800. By knowing the current orientation with respect to the reference orientation, the current heading may be compared against the target heading 120. Moreover, in an embodiment, in case the apparatus 800 is in the wrist device 900 or in the swimming cap 910, the apparatus 800 exhibits certain type of periodical movement pattern depending on the swimming style of the swimmer. By using the IMU 820, this periodical movement pattern may be detected and used in deriving the current 3-dimensional orientation of the apparatus 800. Further, the style of swimming (free-style, butterfly, backstroke, etc.) may be detected by using the IMU 820 of the apparatus 800.

In an embodiment, the orientation apparatus 800 may detect that the swimmer starts swimming. This may take place by detecting the movements of the apparatus 800 with an accelerometer, a gyroscope or any other inertial measurement unit (IMU), comprised in the apparatus 800. With a certain type of movement, the apparatus 800 may determine that current activity is swimming. Thereafter, the apparatus 800 may automatically start in point 300 to check whether or not the swimmer has deviated from the target heading 120. The user of the apparatus 800 (i.e. the swimmer) need not necessarily need to activate the tracking with user input.

Likewise, in an embodiment, the apparatus 800 may detect that the swimmer has stopped swimming and then the apparatus 800 may automatically stop in point 302 to check whether or not the swimmer has deviated from the target heading 120. Again, this may provide the benefit that the user need not him/herself stop the tracking.

Figure 4:
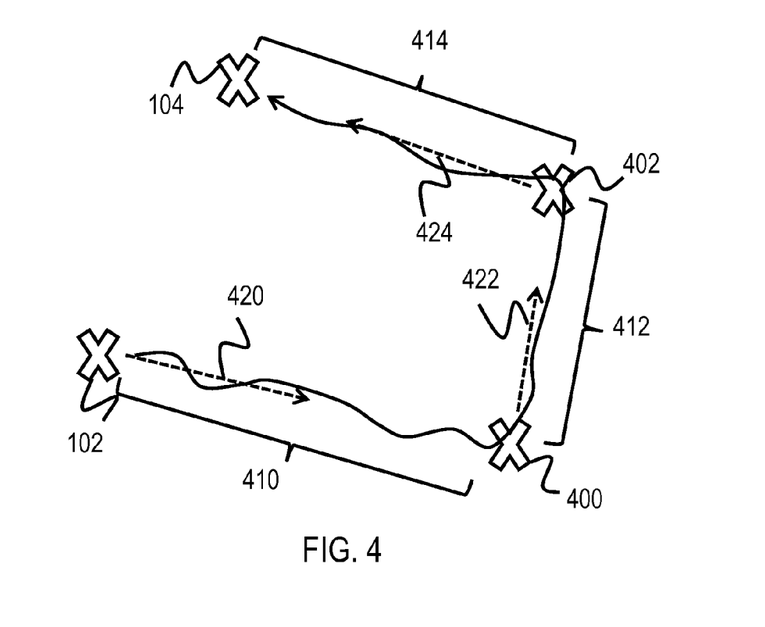

In one embodiment, as shown in FIG. 4, there are multiple targets 400, 402, 104 defining a plurality of swimming parts/legs 410, 412, 414. One part/leg may denote the swimming part between two adjacent targets. In such case, the obtained heading information in step 200 may indicate a plurality of target headings 420, 422, 424, one for each swimming leg 410, 412, 414.

In an embodiment, the orientation apparatus 800 may detect that a target (of the plurality of targets 400, 402, 104) is met. This may take place by detections of the IMU. The IMU may detect that the swimmer makes a turn and, based on that detection, determine that a turning point 400 or 402 is met, for example. On the other hand, at the end of the swimming (at the goal 104), the apparatus 800 may detect that the swimmer stops swimming on the basis of the IMU recordings. For example, a hand motion during swimming may be distinguishable over the hand motion during other type of activities, such as bicycling, walking or running. Instead of or additionally to the IMU readings, in an embodiment, a change in the magnetometer readings exceeding a turning threshold may imply that the swimmer has made an intentional turn towards a new target. The turning threshold may be set for identifying a small unintentional turn and a larger, intentional turn. The threshold may be e.g. 20, 30 or 40 degrees, to mention only a few non-limiting examples. In one embodiment, GPS readings may be used to derive that one of the targets is met. The apparatus 800 may know the geographical coordinates of the targets 400, 402 and 104 and the GPS chip of the apparatus 800 may keep track of the location of the swimmer so that whenever the swimmers reaches a target (passes a target), the apparatus 800 may know this.

The apparatus 800 may determine which swimming leg 412, 414 starts after the detected target 400, 402. The swimming leg 410 is the first swimming leg from the start 102, and may thus be disregarded. The apparatus 800 may keep track of how many targets 400, 402, and 104 the swimmer has passed and, based on that knowledge, determine which swimming leg 412, 414 starts next. Moreover, in case GPS is used, the reached target may be identified on the basis of location information of the targets 400, 402, 104. For example, if it is detected that the reached target is the first target 400, then the swimming leg starting next is the swimming leg 412, which comes after the initial (starting) swimming leg 410.

Next, the apparatus 800 may select the target heading 422, 424 which corresponds to the determined swimming leg 412, 414. For example, the obtained heading information may indicate three consecutive target headings 420-424. In the start the applied target heading is the first heading 420. After the first target 400 is met, the target heading to be followed is the next target heading 422, and so on. In this manner, the apparatus 800 may apply the selected heading as the target heading 422, 424 to be followed during the corresponding swimming leg 412, 414. In this manner the proposed solution is applicable not only to straight line swimming (from the point 102 directly to the point 104) but also to multidirectional swimming (from the point 102 via at least one intermediate turning point 400, 402 to the point 104).

Let us next, with reference to FIGS. 5A to 5E take a look on how the orientation apparatus 800 may obtain the heading information indicating at least one target heading 120 to at least one target 104. For simplicity, the apparatus 800 is depicted to be the wrist device.

Figure 5A:
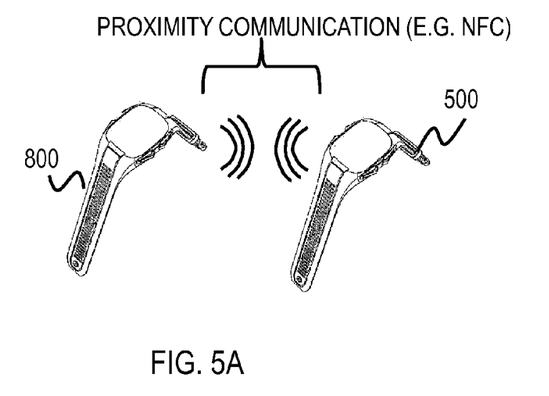
FIGS. 5A to 5E depict ways to obtain heading information, according to some embodiments

In an embodiment of FIG. 5A, the apparatus 800 comprises a wireless receiver applying a proximity communication technique. In this case, the apparatus 800 may wirelessly receive target location information from another user device 500. The other user device 500 may be another wrist device, for example. The user of the user device 500 may have swum the swimming route previously and the user device 500 carried by the user during swimming may have recorded the location of the all the turning locations, by applying GPS, for example. The target location information may thus comprise information indication the locations of each of the at least one target. Alternatively, the complete route may be recorded by the user device 500 with GPS coordinates depicting the route. Then, the users of the apparatuses 500 and 800 may bring the apparatuses in proximity of each other and transfer the target location information from the apparatus 500 to the apparatus 800. Example proximity communication technique may be a near filed communication (NFC) technique. Instead of NFC, the wireless receiver may apply Bluetooth or Bluetooth low energy, for example.

Figure 5B:
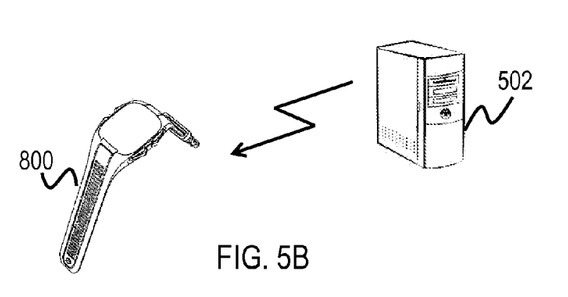

In an embodiment of FIG. 5B, the apparatus 800 obtains the target location information and/or the heading information from a network server 502. For this, the apparatus 800 may comprise a wireless radio receiver, applying e.g. cellular connections, a wireless local area network (WLAN). In one embodiment, the apparatus may comprise a wired interface, such as a universal serial bus (USB), for receiving the heading information via a wire from a mediating computer having access to the network. In one embodiment, the heading and/or target location information may be obtained via a Bluetooth or Bluetooth low energy connection from such a mediating computer. The network server 502 may comprise a database for storing the target location and/or heading information for different outdoor swimming areas.

In an embodiment, the apparatus 800 obtains, from the user device 500, only a reference to an URL to which the apparatus 800 may connect to and from which the apparatus 800 may receive the information. Such URL may be the URL of a database to which the user device 500 has uploaded information of the turning points and/or headings of the previously swam route. Alternatively, the complete route may be stored to the database with GPS coordinates depicting the route. Then these GPS coordinates may be downloaded to the apparatus 800.

In an embodiment, the received target location and/or heading information may indicate a plurality of target headings 420-424, one for each swimming leg 410-414. However, in another embodiment, there is only one target heading 120 comprised in the target location and/or heading information.

In one embodiment, there is a plurality of targets 400, 402, 104 and the received information indicates locations for each of the targets 400, 402, 104. The location may be given as a combination of the target heading and a corresponding distance, or as geographical coordinates (such as GPS coordinates).

Figure 5C:
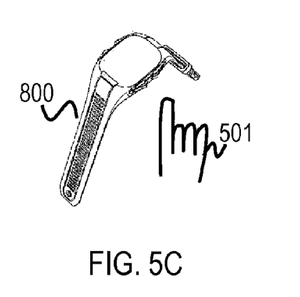

In an embodiment of FIG. 5C, the apparatus 800 further comprises a user input element for enabling the user 501 to input the target location and/or heading information. The user 501 may know the target locations and/or target heading(s) and input the data him/herself.

In an embodiment, the apparatus 800 may determine the heading information based on the received target location information.

Figure 5D:
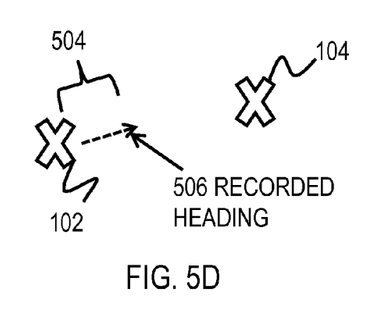

In an embodiment of FIG. 5D, the apparatus 800 may record the current heading of the swimmer for a predetermined time or distance 504 during the swimming. It may be assumed that the swimmer, before starting to swim, sees the target 104 and starts swimming in the correct heading. The predetermined time or distance 504 may be long enough to record the heading but short enough so that possible deviation(s) from the correct heading are most likely not recorded. Thereafter, the apparatus 800 may store the recorded heading 506 as the target heading 120 to be followed during swimming. The recorded heading 506 may, in one embodiment, be the average heading during the predetermined time or distance 504. The predetermined distance may be empirically derived and pre-set to the apparatus 800.

Figure 5E:
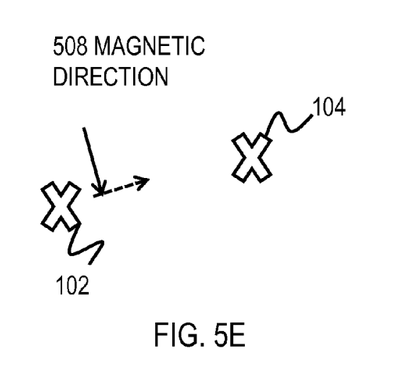

In an embodiment of FIG. 5E, the apparatus 800 may detect a magnetic direction corresponding to the direction of the target 104. For example, it may be detected how much the direction of the target deviates from the Earth's magnetic north when looking from the start point 102. This detected magnetic direction 508 may be stored as the target heading 120 to be followed during swimming.

During swimming, the apparatus may either constantly or according to predetermined intervals check the current heading and/or current location of the swimmer against the target heading 120 and, if deviations are detected, the apparatus 800 may inform the swimmer.

In an embodiment, there may be a predetermined margin within which the swimmer may deviate from the target heading 120. In case the deviation stays within the margins, the apparatus 800 may decide not to inform the swimmer. However, in case the apparatus 800 detects that the swimmer deviates from the target heading more than the predetermined margin, the apparatus 800 may inform the swimmer that the swimmer has deviated from the target heading 120. The margin may be determined and inputted by the user, or the margin may be pre-set in the apparatus.

Figure 6A:
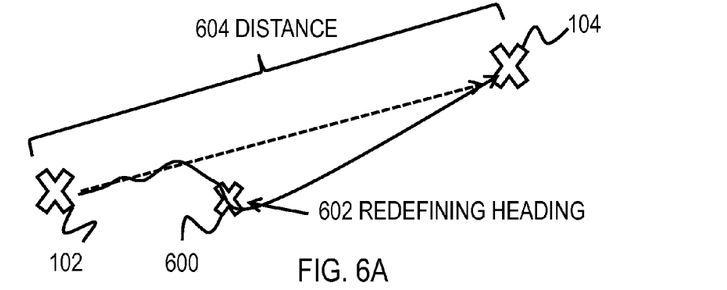
FIG. 6A depicts redefining the target heading, according to some embodiments.

In an embodiment, as shown in FIG. 6A, the apparatus 800 may determine the current location 600 of the swimmer. The location may be determined based on at least one of the following: previously applied heading(s) during the swimming, time of swimming, average speed of the swimmer. The previously applied heading(s) may be used to derive an average heading for the past swimming. Instead or additionally, the current location 600 may be determined based on satellite positioning (e.g. GPS readings). The time of swimming may be known from the internal clock of the apparatus 800 and the speed of swimming may be known on GPS data or estimated from the data recorded by the IMU of the apparatus, for example. Thereafter, in case the swimmer is not anymore along the optimal route 110 (i.e. swimming line) defined by the target heading 120, the apparatus 800 may, in point 602, redefine the target heading 120 during swimming on the basis of the current location. Thereafter, the apparatus 800 may apply the redefined heading as the target heading 120 to be followed during the swimming, at least until reaching the next target 104. This embodiment may provide a shortest line from the current location 600 of the swimmer to the next target 104.

In Figures the depicted heading 120 is the target heading at the moment of time when the person starts swimming from the start 102. However, it should be noted that the target heading may change during swimming by the apparatus redefining the target heading 120 (in step 602) each time it is detected that the swimmer has deviated from the target heading.

In order for the embodiment of FIG. 6A to work more reliably, without any assumptions regarding the distance 604 to the next target 104, the apparatus 800 may in an embodiment obtain target distance information. This may be obtained in a similar manner as obtaining the heading information, for example. The distance information may indicate the distance 604 to the at least one target 104 from the previous reference point, such as from the start 102 or from the previous turning location. The distance 604 may be given as an explicit value or as geographical coordinates defining the location of the target 104. Using this information, the apparatus 800 may obtain knowledge on how far the next target 104 is from the starting location. It may be noted that, as the apparatus 800 may know/estimate the current location 600 of the swimmer, the apparatus 800 may determine how far the next target 104 is from the current location 600. This may be beneficial in that the apparatus 800 may define a new target heading 120 more accurately.

In one embodiment, redefining of the target heading 120 in step 402 is performed only when the swimmer is detected to have deviated from the target heading 120 more than a predetermined deviation threshold. Thus, for small deviations, the swimmer may still apply the current target heading 120 and still reach the target 104. The deviation threshold may be set by the swimmer or pre-set to the apparatus 800.

In one embodiment, the new target heading is defined so that the swimmer swims back to the optimal route 110 as quickly as possible, after which the apparatus 800 again applies the original target heading 120.

In an embodiment, satellite positioning (e.g. GPS) may be used in determining the current location 400 of the swimmer and in redefining a new target heading 120.

Although not necessary, in one embodiment, the obtained heading information in step 200 indicates a target route 110 to the target 104. The target route may be defined by the target heading 120 and the target distance information or it may be indicated by satellite positioning (e.g. GPS) coordinates of the complete route or of the start point 102 and of the one or more target points 104. The target route 110 may be the shortest route to the target 104. The shortest route may be direct line, or in case there are obstacles, such as peninsulas, between, the shortest route 110 may comprise at least one turning point 400, 402. In this embodiment, the apparatus 800 may check whether or not the swimmer has deviated from the target route 110. This may take place on the basis of checking the current GPS coordinates to the GPS information of the route 110, or on the basis of deriving the current location of the swimmer by analysing the previously applied heading(s) during the swimming, time of swimming, and average speed of the swimmer. In case such deviation has occurred, the apparatus 800 may navigate the swimmer back to the route 110 or redefine a new target route 110 (in the same manner as defining a new target heading 120). The apparatus 800 may navigate the swimmer along the target route 110 to the target 104. For the navigation, the apparatus 800 may apply satellite positioning or, as described above, estimation of the current location 400 and the knowledge of the location of the next target 104, for example.

Figure 6B:
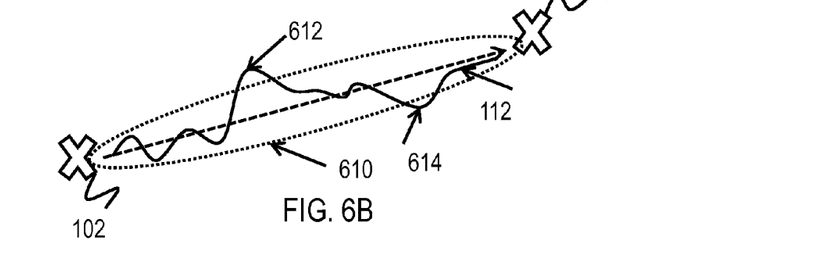
FIG. 6B defines a swimming zone, according to an embodiment.

Also in the case of navigation, as shown in FIG. 6B, there may be a predetermined margin surrounding the target route 110 within which the swimmer may stay without the apparatus 800 informing him/her about the deviation. This margin thus defines an accepted swimming zone 610 around the target route 110. However, if the apparatus detects that the swimmer deviates from the route 110 more than allowed by the margin, as at points 612 and 614, then the apparatus 800 may start navigating the swimmer back to the route 110 or at least back to the swimming zone 610. The margin may be determined and inputted by the user, or the margin may be pre-set in the apparatus 800. The swimming zone may comprise, e.g., a couple of meters to both sides of the target route 110.

Let us then consider how the apparatus 800 may inform the swimmer about the deviation. In an embodiment, the informing is given via the apparatus' user interface element comprising speakers. Thus, the informing may take place via audio signals. The speakers may be integrated to the swimming cap of the swimmer, for example. The audio signals may tell how much the swimmer has deviated from the target/optimal route 110 or from the target/optimal heading 120, and to which direction (left/right) the deviation has been made or to which direction the correction is to be made.

Figure 7A:
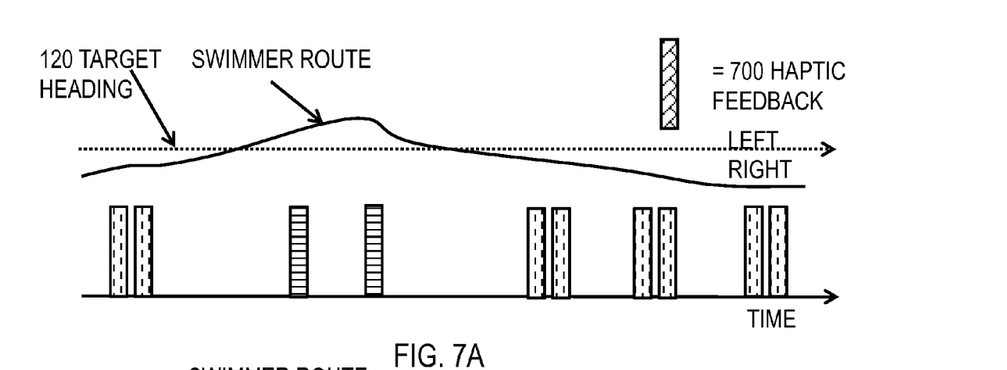
FIGS. 7A and 7B illustrate ways to inform the swimmer about deviated course, according to some embodiments.

In another embodiment, the apparatus may cause a haptic feedback 900 to the swimmer when the swimmer has deviated from the target heading 120 or from the target route 110, as the case may be. The haptic feedback 700 may comprise vibration alert by the apparatus' user interface element, for example. As shown in FIG. 7A, the left and right deviations may have different types of haptic feedbacks 700. For example, when the swimmer deviates to the right, the haptic feedback 700 may cause two consecutive vibrations with only a short interval in between. However, if the deviation is to the left, the two consecutive vibrations may be more spaced from each other. In other words, when the swimmer has not kept the correct route and deviated to the left, he/she may be alerted by wrist unit's vibration alert as single repeating vibrations indicating "you are too much at left, take direction to more right". On the other hand, when athlete gets too much to the right, he/she may be alerted with double repeating vibration indicating "you are too much at right, take direction to more left". Any other types of distinguishable haptic feedback 700 are possible to separate the two different heading deviations.

The vibrations may be applied to correct the current heading of the swimmer or in the route navigation scenario, i.e., the feedbacks may be different depending on which side the swimmer is with respect to the target route 110. Therefore, at point 612 of FIG. 6B, the apparatus 800 may provide single repeating vibrations, whereas at point 614 the apparatus 800 may provide double repeating vibrations.

Figure 7B:
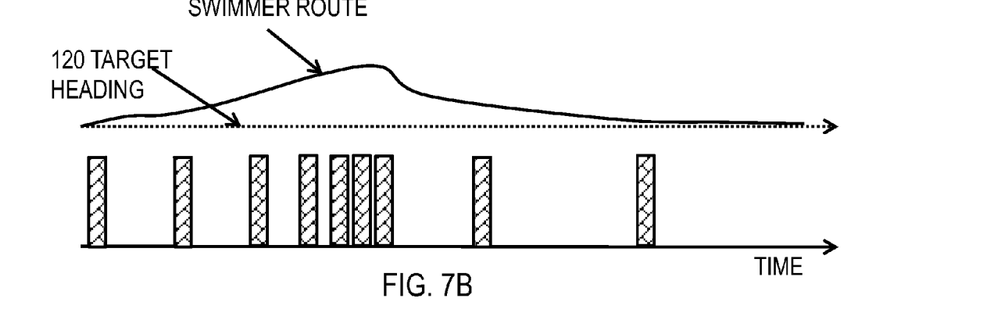

In yet one embodiment, as shown in FIG. 7B, the intervals between repeating haptic feedbacks 700 may indicate the amount deviation. As shown in FIG. 7B, the haptic feedbacks are more frequent when the deviation is large than when the deviation is small.

In yet one embodiment, if the swimmer does not care about the haptic feedback alerts 700, the alerts 700 may be manually (for example double-tap on the apparatus 800) or automatically (e.g. after a predefined time duration) removed.

In yet one embodiment, the haptic feedbacks 700 may be used in swimming also to keep a selected heart rate zone, speed zone or cadence zone, for example. In case, the heart rate drops below the zone, certain type of vibrations may be given. On the other hand, when the heart rate zone rises above the specified zone, other type of vibrations may be provided.

Let us look further at FIG. 8 depicting the orientation apparatus 800. The apparatus 800 may further comprise a radio interface 806 comprising hardware and/or software for realizing communication connectivity according to one or more communication protocols, such as near field communication (NFC) 808, Bluetooth connection and/or a cellular/WLAN connection, for example. In an embodiment, the interface 806 may further comprise a GPS receiver 810 for receiving satellite signals for navigation.

The apparatus 800 may also comprise a user interface element 812 comprising, for example, at least one of a keypad, a microphone, a touch display, a display, a speaker 816, a haptic interface 814, etc. The user interface 812 may be used to control the apparatus 800 by the user.

The apparatus 800 may further comprise a magnetometer 818 for detecting the target heading 120 to be followed on the basis of magnetic directions with respect to the Earth's magnetic north.

An inertial navigation unit (IMU) 820 may comprise e.g. at least one accelerometer and/or at least one gyroscope, and it may be used for detecting movements of the apparatus 800.

The control circuitry 802 may comprise an activity type detection circuitry 830 for detecting which activity, such as swimming, the user is now practising. Further, the swimming style may be detected. A heading determination circuitry 832 may be for determining/obtaining the target heading 120 according to any of the embodiments. A heading control circuitry 834 may be for controlling that the swimmer stays along the target heading 120, and for informing the swimmer if directional changes are needed. This circuitry 834 may also be responsible of navigating the swimmer on the target route 110, according to an embodiment.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An orientation apparatus for swimming, comprising:
    an attachment unit for attaching the apparatus to a swimmer;
    a user interface element;
    an optical heart activity sensor;
    an inertial measurement unit;
    at least one processor and at least one memory including a computer program code, wherein the at least one memory and the computer program code are configured, with the at least one processor, to cause the apparatus to perform operations comprising:
    obtaining heading information indicating a target heading to a target;
    detecting, during swimming, that the swimmer deviates from the target heading;
    informing the swimmer, via the user interface element, that the swimmer has deviated from the target heading;
    detecting that the swimmer either starts or stops swimming;
    detecting activity of the swimmer using the optical heart activity sensor to measure heart activity data;
    automatically starting determination of whether the swimmer has deviated from the target heading in response to detecting, based on measurement by the inertial measurement unit, that the swimmer starts swimming; and
    automatically stopping determination of whether the swimmer has deviated from the target heading in response to detecting, based on measurement by the inertial measurement unit, that the swimmer stops swimming and starts another type of physical activity.

2. The apparatus of claim 1, wherein the target heading is based on at least one of the following: a magnetic direction of the target, geographic coordinates of the target.

3. The apparatus of claim 1, wherein there is a plurality of targets defining a plurality of swimming parts, and the heading information indicates a plurality of target headings, one for each swimming part.

4. The apparatus of claim 3, wherein the at least one memory and the computer program code are configured, with the at least one processor, to cause the apparatus to further perform operations comprising:
    detecting that a target is reached;
    determining which swimming part starts after the reached target;
    selecting the heading which corresponds to the determined swimming part; and
    applying the selected heading as the target heading to be followed during the determined swimming part.

5. An orientation apparatus for swimming, comprising:
    an attachment unit for attaching the apparatus to a swimmer;
    a user interface element;
    a wireless receiver;
    an optical heart activity sensor;
    at least one processor and at least one memory including a computer program code, wherein the at least one memory and the computer program code are configured, with the at least one processor, to cause the apparatus to perform operations comprising:
    obtaining heading information indicating a target heading to a target;
    detecting activity of the swimmer using the optical heart activity sensor to measure heart activity data;
    detecting, during swimming, that the swimmer deviates from the target heading; and
    informing the swimmer, via the user interface element, that the swimmer has deviated from the target heading, wherein obtaining the heading information comprises:
    wirelessly receiving target location information from another user device, the target location information comprising geographical coordinates of the target location, wherein the wireless receiver applies proximity communication for receiving the target location information; and
    determining the heading information based on the received target location information.

6. The apparatus of claim 1, wherein obtaining the heading information comprises:
    recording the current heading of the swimmer for a predetermined time or distance during the swimming; and
    storing the recorded heading as the target heading to be followed during swimming.

7. An orientation apparatus for swimming, comprising:
    an attachment unit for attaching the apparatus to a swimmer;
    a user interface element;
    a wireless receiver enabling cellular communication;
    an optical heart activity sensor;
    at least one processor and at least one memory including a computer program code, wherein the at least one memory and the computer program code are configured, with the at least one processor, to cause the apparatus to perform operations comprising:
    obtaining heading information indicating a target heading to a target;

detecting activity of the swimmer using the optical heart activity sensor to measure heart activity data;
detecting, during swimming, that the swimmer deviates from the target heading;
informing the swimmer, via the user interface element, that the swimmer has deviated from the target heading, wherein obtaining the heading information comprises:
wirelessly receiving target location information, the target location information comprising geographical coordinates of the target location, wherein the wireless receiver applies a cellular connection for receiving the target location information; and
determining the heading information based on the received target location information.

8. An orientation apparatus for swimming, comprising:
an attachment unit for attaching the apparatus to a swimmer;
a user interface element;
a wireless receiver enabling cellular communication;
an optical heart activity sensor;
an inertial measurement unit;
at least one processor and at least one memory including a computer program code, wherein the at least one memory and the computer program code are configured, with the at least one processor, to cause the apparatus to perform operations comprising:
obtaining heading information indicating a target heading to a target, the obtaining heading information comprising wireles sly receiving target location information, the target location information comprising geographical coordinates of the target location, wherein the wireless receiver applies a cellular connection for receiving the target location information, the obtaining heading information comprising determining the heading information based on the received target location information;
detecting activity of the swimmer using the optical heart activity sensor to measure heart activity data;
detecting, during swimming, that the swimmer deviates from the target heading;
informing the swimmer, via the user interface element, that the swimmer has deviated from the target heading;
determining the current location of the swimmer;
redefining the target heading during swimming based on the current location;
applying the redefined heading as the target heading to be followed;
detecting that the swimmer either starts or stops swimming;
automatically starting determination of whether the swimmer has deviated from the target heading in response to detecting, based on measurement by the inertial measurement unit, that the swimmer starts swimming; and
automatically stopping determination of whether the swimmer has deviated from the target heading in response to detecting, based on measurement by the inertial measurement unit, that the swimmer stops swimming and starts another type of physical activity.

9. The apparatus of claim 8, wherein the at least one memory and the computer program code are configured, with the at least one processor, to cause the apparatus to further perform operations comprising:
obtaining target distance information indicating a distance to the target; and
taking the distance to the target into account when redefining the target heading.

10. The apparatus of claim 1, wherein the heading information further indicates a target route to the target, and the at least one memory and the computer program code are configured, with the at least one processor, to cause the apparatus to further perform operations comprising navigating the swimmer along the target route to the target.

11. The apparatus of claim 1, wherein detecting that the swimmer deviates from the target heading comprises:
detecting whether or not the swimmer has deviated from the target heading more than a predetermined margin; and
informing, via the user interface element, that the swimmer has deviated from the target heading only when the swimmer has deviated from the target heading more than the predetermined margin.

12. An orientation apparatus for swimming, comprising:
an attachment unit for attaching the apparatus to a swimmer;
a user interface element;
a wireless receiver enabling cellular communication;
an optical heart activity sensor;
an inertial measurement unit;
at least one processor and at least one memory including a computer program code, wherein the at least one memory and the computer program code are configured, with the at least one processor, to cause the apparatus to perform operations comprising:
obtaining heading information indicating a target heading to a target, the obtaining heading information comprising wireles sly receiving target location information, the target location information comprising geographical coordinates of the target location, wherein the wireless receiver applies a cellular connection for receiving the target location information, the obtaining heading information comprising determining the heading information based on the received target location information;
detecting activity of the swimmer using the optical heart activity sensor to measure heart activity data;
detecting, during swimming, that the swimmer deviates from the target heading;
informing the swimmer, via the user interface element, that the swimmer has deviated from the target heading, wherein informing the swimmer, via the user interface element, that the swimmer has deviated from the target heading comprises causing haptic feedback, wherein left and right deviations have different types of haptic feedbacks, wherein intervals between repeating haptic feedbacks indicates the amount of deviation;
detecting that the swimmer either starts or stops swimming;
automatically starting determination of whether the swimmer has deviated from the target heading in response to detecting, based on measurement by the inertial measurement unit, that the swimmer starts swimming; and
automatically stopping determination of whether the swimmer has deviated from the target heading in response to detecting, based on measurement by the inertial measurement unit, that the swimmer stops swimming and starts another type of physical activity.

13. The apparatus of claim 1, wherein the apparatus is comprised in a wrist device or in swimming gear.

14. The apparatus of claim 12, further comprising informing the swimmer, via the user interface element, that the swimmer has deviated from a selected heart rate zone, wherein informing the swimmer, via the user interface element, that the swimmer has deviated from the selected heart rate zone comprises causing haptic feedback that indicates the swimmer has deviated from the selected heart rate zone.

* * * * *

UNITED STATES PATENT AND TRADEMARK OFFICE
CERTIFICATE OF CORRECTION

PATENT NO. : 9,772,190 B2  
APPLICATION NO. : 14/513902  
DATED : September 26, 2017  
INVENTOR(S) : Mika Erkkila, Harri Maatta and Jonna Puurunen

Page 1 of 1

It is certified that error appears in the above-identified patent and that said Letters Patent is hereby corrected as shown below:

In the Claims

Column 14, Line 27 (approximately) Claim 12:  
Now reads: "...wireles sly..."  
Should read: -- ...wirelessly... --

Signed and Sealed this  
Third Day of April, 2018

Andrei Iancu  
*Director of the United States Patent and Trademark Office*